Patented Jan. 21, 1930

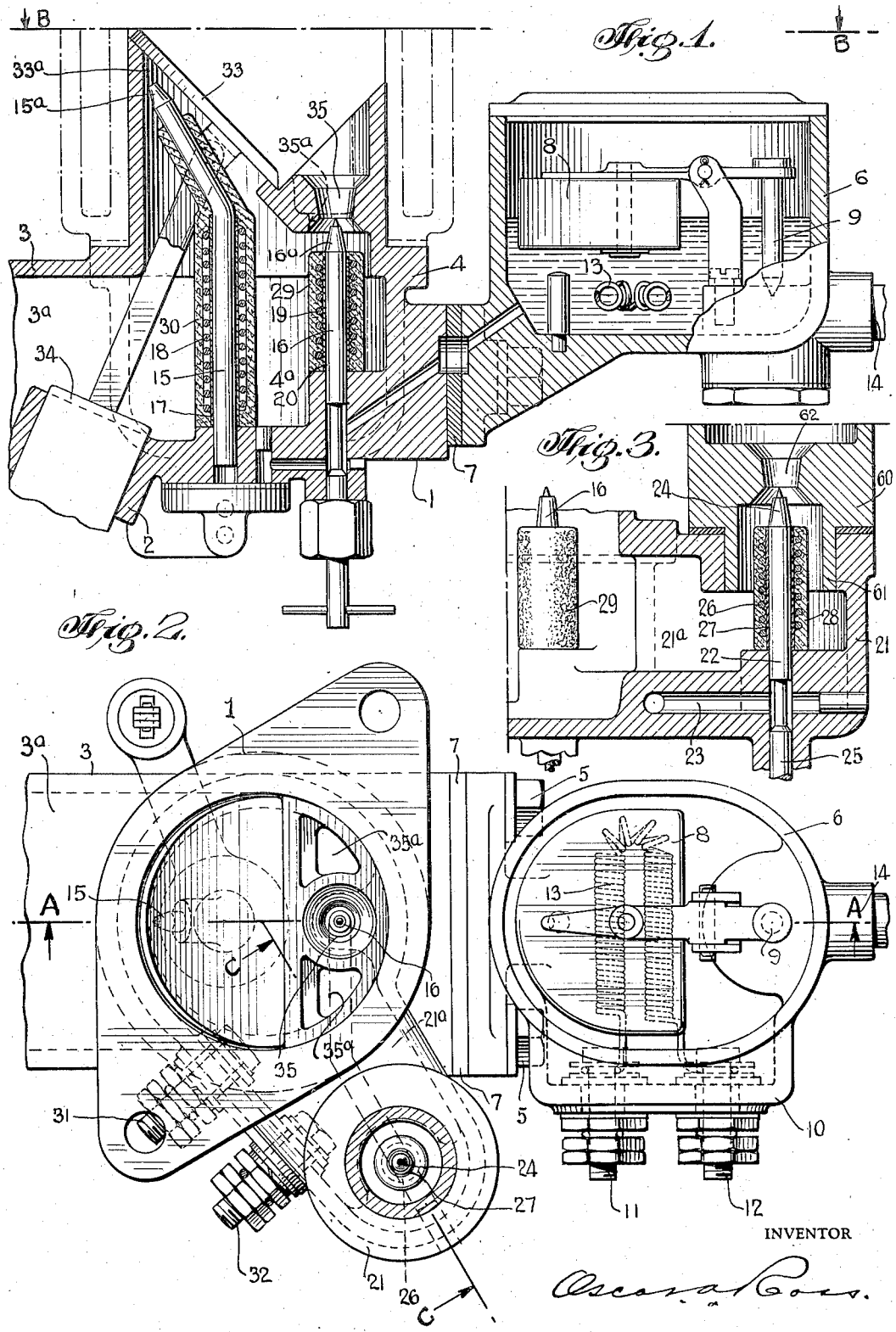

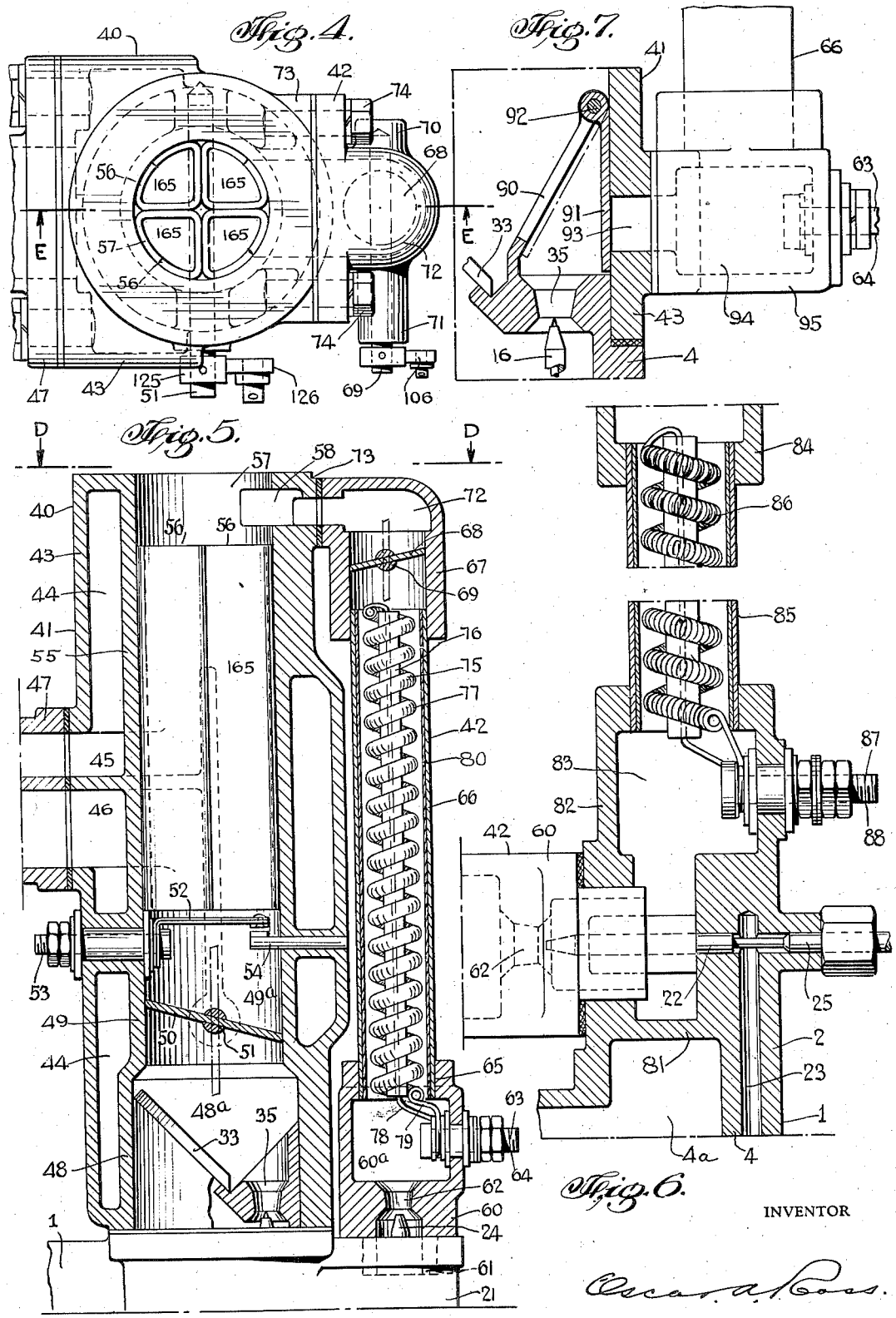

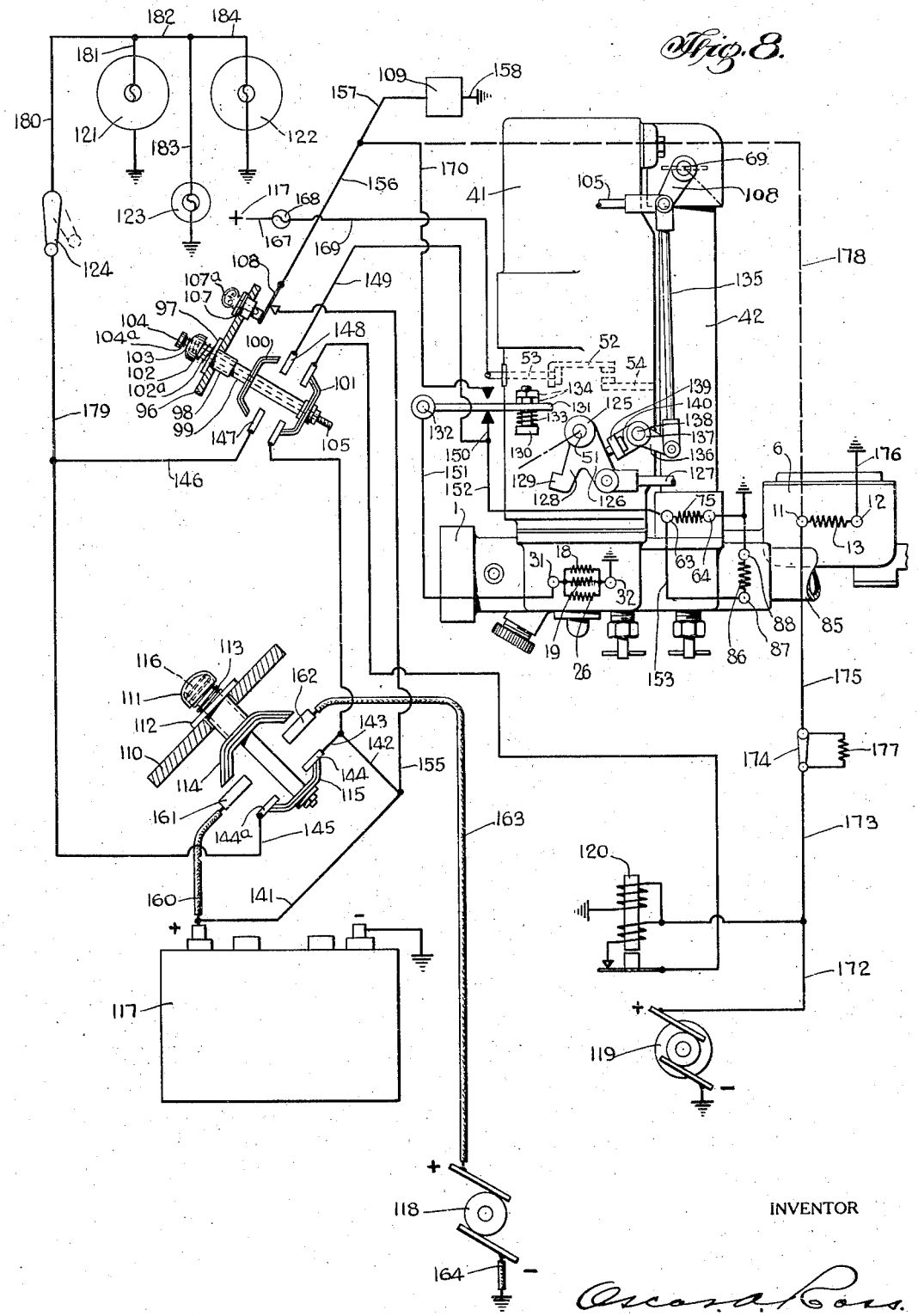

1,744,082

UNITED STATES PATENT OFFICE

OSCAR A. ROSS, OF NEW YORK, N. Y.

CARBURATION SYSTEM AND SYSTEM OF CONTROL THEREFOR

Application filed May 21, 1927. Serial No. 193,219.

This invention relates to carburation systems and a system of control therefor, and, more particularly to that class associated with hydro-carbon motors wherein a non-readily volatile hydro-carbon liquid is suspended in a combustion supporting gas to form a combustible mixture whereafter the mixture is subjected to a comparatively low compression in the cylinders of the motor prior to ignition and more particularly to that type where high volumetric efficiency is not of first consideration at all throttle openings.

A type of hydro-carbon motors wherein non-readily volatile oils, as for example, kerosene or fuel oil, is employed, is known as Deisel, semi-Deisel, or, "high compression type," and whereas these motors are very useful, they have at least two prominent objections for use on motor vehicles, namely, excessive weight, and inflexibility.

Other motors operating these oils employ a comparatively low compression and more nearly resembles the gasolene hydro-carbon motors employed on motor vehicles and numerous suggestions have been made for starting these motors, the most cofmmon being to start on gasolene and after the motor has warmed up, switch over to kerosene, or fuel oil, other than gasolene.

This invention relates to this latter type of "low compression" motors.

One object of this invention is to furnish a system of carburation employing non-readily volatile fuels wherein a "cold motor" may be quickly started by the use of non-readily volatile fuel only.

Another object is to furnish a system wherein the liquid fuel is primarily heated in the float chamber and subsequently highly heated in the nozzle tubes whereby a very fine atomization of the fuel is obtained due to the resulting low viscosity of the heated fuel.

Another object is to furnish a system of carburation wherein the fuel is preheated in the nozzles of a carburetor during maximum, or near maximum performance of hydro-carbon motor and whereby the fuel is finely atomized in a combustion supporting gas, as for example, air, however the resulting combustible mixture is not expanded by heat prior to entry into the cylinders of said motor, whereas at normal, or partial load performance of said motor, the fuel in the nozzles is not preheated before atomization however the combustible mixture is subjected to heat whereby the atomized fuel is gasified and the combustion supporting gas expanded prior to entry into the cylinders of said motor.

Another object of this invention is to furnish a carburation system and system of control therefor whereby the lighting system or other auxiliary circuits, not required for starting a hydro-carbon motor are automatically cut out, or annulled during the starting cycle of operating such motors.

Another object is to furnish a carburation system for low compression hydro-carbon motors, employing non-readily volatile oils as a fuel, wherein when starting the motor indicating means are furnished to disclose when the motor is sufficiently heated for normal operation.

Another object is to furnish a system of carburation for low compression hydro-carbon motors, employing non-readily volatile liquids as fuel wherein a subsidiary carburation system consumes non-readily volatile oil during the starting period of the motor and another subsidiary carburation system consumes the same oil during the normal operating period of the motor and in addition, supplying means whereby one subsidiary system is completely annulled while the other is effective.

Another object is to furnish a system of carburation for low compression hydro-carbon motors wherein the combustion supporting gas, as for example air, is preheated before reaching the atomizing nozzles of the carburetor whereby the preheated air will assist in the atomization of the fuel and, if desired, subsequently cause gasification of the combustible mixture of which the combustion supporting gas forms a part.

Another object is to furnish a system of carburation for hydro-carbon motors employing carburetors having an idling speed nozzle and an accelerated speed nozzle, and, wherein the idling speed nozzle is employed as the fuel atomizing agent of one subsidiary carburation system during the starting period of the motor and also as a similar agent of another subsidiary system during the normal operating period of the motor.

Other objects and advantages will appear as the description of the invention progresses, and the novel features of the invention will be pointed out in the appended claims.

This invention consists in the novel construction and arrangement of parts hereinafter described, delineated in the accompanying drawings, and particularly pointed out in that portion of the instrument wherein patentable novelty is claimed for certain and peculiar features of the invention, it being understood that, within the scope of what hereinafter thus is claimed, divers changes in the form, proportions, size and minor details of the system may be made without departing from the spirit of, or sacrificing any of the details of the invention.

In describing the invention in detail, reference is had to the accompanying drawings wherein I have illustrated embodiments of my invention, and wherein like characters of reference designate corresponding parts through the several views, and in which:—

Figure 1, is a sectional view of the preferred carburetor forming part of the system and is taken on line A—A of Figure 2, and, Figure 2 is a top elevational view of the same device taken on line B—B of Figure 1, and Figure 3, is a part sectional view of the same device taken on line C—C of Figure 2, and, Figure 4, is a top elevational view of the preferred form of gasifying units forming part of the system and is taken on line D—D of Figure 5, and, Figure 5, is a sectional view of the same device taken on line E—E of Figure 4, and, Figure 6, is a modification partly in section of part of the unit shown in Figures 4 and 5, and, Figure 7, is a modification partly in section of a combined portion of the carbureter shown in Figures 1 and 2, and the gasifying unit shown in Figures 4 and 5, and, Figure 8, is a part diagrammatic, part wiring diagram of the complete system.

Referring to Figures 1, 2 and 3, the carbureter 1, comprises body portion 2, having air inlet section 3, nozzle section 4 and to which is secured, by screws 5—5, the float chamber 6, caloric insulating washer 7, being interposed there between.

In the float chamber 6, is the usual float 8 and valve 9 of well-known function. Secured to but insulated from the wall 10 of float chamber 6, are the terminal posts 11 and 12 adapted to rigidly support the heating unit, or resistance 13, normally submerged in the fuel supplied to float chamber 6 through connection 14.

In nozzle section 4 are mounted the accelerated speed nozzle tube 15, and idling speed nozzle tube 16, receiving fuel as more fully described in my pending application for Letters Patent, Serial No. 186,087, filed April 23rd, 1927. Encircling nozzle tube 15, but insulated therefrom by insulation 17, is heating unit, or resistance 18. A similar unit 19, encircles idling nozzle 16, but is insulated therefrom by insulation 20.

Also located in extension 21, of nozzle section 4 is starting nozzle tube 22, receiving fuel from canal 23, the flow of fuel through nozzle 24 being controlled by needle valve 25. Encircling nozzle tube 22, is heating unit, or resistance 26, insulated therefrom by insulation 27. Caloric insulations 28, 29 and 30, encircling the units 18, 19 and 26, serve to prevent undue chilling of said units by inrushing air.

One terminal of each of the units 18, 19 and 26 is secured to terminal post 31 and the other terminal to post 32.

Also forming part of carbureter 1, is accelerated speed valve 33, retarded by dashpot 34; and idling speed venturi 35, more fully described in my pending application for Letters Patent, Serial Number 186,087, filed April 23rd, 1927.

Referring to Figures 4, and 5, gasifying unit 40, comprises primarily normal operating gasifying unit 41, and starting gasifying unit 42.

Normal operating gasifying unit 41, is a modification of a similar unit disclosed in my pending application for Letters Patent, Serial Number 186,087, filed April 23rd, 1927, and comprises cast body 43, having hot gas chamber 44 communicating with inlet 45 and outlet 46, leading to exhaust manifold 47 shown in part. Unit 41 also comprises atomizing section 48 and throttle section 49, the latter containing throttle valve 50 mounted on shaft 51, also thermostat 52, secured to, but insulated from body 43 by terminal post 53 and adapted, when heated, to establish a circuit to ground post 54. Unit 41, also comprises gasifying section 55, containing heat radiating members 56—56, the upper opening 57 of which communicates to an intake manifold (not shown) and also by orifice 58 to the starting gasifying unit 42.

Starting gasifying unit 42 comprises in part venturi section 60, having male sleeve 61 suitably secured in extension 21 of carbureter 1; venturi 62 arranged over nozzle 24; terminal posts 63 and 64 secured to but insulated from said section; and orifice 65 secured in which is one end of tube, or pipe 66, the other end being suitably secured in the throttle housing 67 having throttle 68 secured to shaft 69 operating in bearings 70 and 71, and the chamber 72 communicating with opening 58 of unit 41, said member being secured to boss 73 of said unit by screws 74—74.

Suitably secured in tube 66 is air-heating unit, or resistance 75, preferably comprising a hollow core 76 of insulating material on which is wound a coiled resistance 77, the upper terminus 78 of which passes down through the core 76 and is secured to the post 63, the lower terminus 79 of said coil being secured to post 64.

The inner wall of tube 66 is preferably lined with a caloric and electric insulating material, as 80, to prevent radiated loss of heat, of the gasified mixture through tube 66, and to also prevent electrical contact of unit 75 therewith.

Whereas in Figures 4 and 5, the unit 42 has, for purposes of clearer illustration, been shown as located on the same plane as the axis of exhaust manifold 47, it is to be understood that it may be angularly displaced whereby its location is substantially as shown by carbureter 1, (see extension 21 of Figure 2) of the drawings.

Referring to Figure 6. The body portion 2, of carbureter 1, has been modified by the addition of wall 81, closing the communication between air inlet section 3 and venturi 62 of unit 42. Also by the addition of air entrance portion 82, having chamber 83 communicating to venturi 62, and air inlet 84, interposed between and secured to which is tube 85 supporting heating unit 86, similar in structure to unit 75, and the terminals of which are secured to terminal posts 87 and 88.

Referring to Figure 7, comprising a modification of carbureter 1 and gasifying unit 41, and whereby nozzle tube 22, valve 68 and venturi 62 may be omitted valve 92 being controlled similarly to valve 68, the nozzle section 4, of carburetor body 2 has been modified above venturi 35 to include a port 90 adapted to be closed by valve 91 secured to shaft 92, similar in structure and function to shaft 69, extending through and to the exterior of body 67 of unit 42. Valve 91 normally closes port 93 communicating to chamber 94 of terminal post number 95, suitably secured to body 43 and supporting tube 66 and terminal posts 63 and 64.

Referring to Figure 8, suitably mounted on dash-board 96, is starting, or conditioning switch 97, comprising bushing 98 through which passes tubular number 99 supporting insulated circuit controllers 100 and 101 below the dash, and handles 102 and 104 above the dash. Adapted to slide in number 99 is starting control rod 103, the upper end of which carries handle 104 and the lower, extension 105 which is pivotally connected to link 106 secured to shaft 69 of unit 42.

Also suitably mounted on dash 96 is ignition switch 107 controlling lever 108 supplying energy to ignition unit 109.

Suitably mounted on floor board 110, is starter switch 111 comprising bushing 112, passing through which is rod 113, supporting insulated circuit controller 114 and 115 on its lower end, and foot button 116 at its upper end.

Storage battery 117, starting motor 118, generator 119, cutout 120, head lamps 121 and 122, tail lamp 123 and manually operated lighting switch 124 form well known units employed on hydro-carbon motor vehicles.

Mounted on throttle shaft 51 of unit 41 is bell crank 125, comprising extension 126, to the outer end of which is pivoted one end of link 127, the other end of which being connected to the accelerator pedal (not shown) of well-known form and function; and extension 128, the boot-end 129 of which is adapted to impinge on head of screw 130 freely passing through contact lever 131 pivoted at 132, spring 133 normally acting to restrain screw 130 downward whereby nuts 134—134 adjustably secured to screw 130, are caused to impinge onto the upper side of lever 131.

Also pivoted to the free end of link 106 is the upper end of rod 135, the lower end terminating in extension 136 of bell crank 137, pivoted on pin 138, whereas extension 139 carries adjustably mounted screw 140 acting as a stop for throttle lever 125, at idling performance of the motor.

The operation of the system is as follows: Assume a hydro-carbon motor to which my improved system is attached, is cold, that is, has been in-operative for a considerable period whereby the various parts have acquired a temperature approximating its surrounding atmosphere, and that it is desired to start the motor, employing a non-readily volatile fuel oil, as for example kerosene, as a fuel. The handles 102 and 104, of switch 97 are depressed (see Fig. 8) whereupon the following circuits are established.

*Nozzle heating circuit.*—From positive battery (117) to wires 141, 142 and 143, contact 144 circuit controller 115, contact 144ª, wires 145, 146, contact 147, circuit controller 100, contact 148, wires 149, 150, contact lever 131, wire 151 to terminal post 31 and thence through the three heating units 18, 19 and 26 to terminal post 32, thereafter returning to battery via ground. Simultaneously another circuit is established as follows:—

Gasifying circuit

From battery 117 as hereintofore described up and through wire 149, thence to wire 152, terminal post 63, and through heating unit 75 to terminal post 64, returning to battery via ground. If an air preheating arrangement, as shown in Figure 6, forms part of the system as shown in Figure 8, the following circuit is established:—

Air preheating circuit

From battery 117 up to terminal post 63 and thence through wire 153, to terminal post 87, thence through heating unit 86 to terminal post 88, returning to battery 117 via ground.

With the aforesaid circuit established the heating units 18, 19, 26, 75, and if included, unit 86, are substantially heated.

Simultaneously with depressing handle 102, handle 104, is also conveniently depressed whereupon rod 105 moves throttle lever 106 to the right in this manner opening starting period throttle 68 to the dotted position shown in Figure 5. As lever 106 moves to the right, rod 135 is first slightly lowered and then raised whereby bell crank 137 is rotated counter-clockwise and stop screw 140 is moved away from extension 126 of throttle lever 125, in this manner, permitting normal operating period throttle valve 50 to completely close.

Simultaneously with, or if desired, either immediately before or after depressing handles 102 and 104, the ignition key 154 is inserted in ignition lock 106, whereupon the ignition circuit to unit 109, is established as follows:

*Ignition circuit*

From positive battery (117), wires 141, 155, lever 107, wires 156 and 157 to unit 109 returning to battery 117 via wire 158 and ground.

A short interval of time, preferably about five seconds after handles 104 and 102 have been depressed, the starter button 116 of starter switch 111 is depressed. As this occurs, the lowering of circuit closer 115 from contacts 144 and 144$^a$ opens the nozzle circuit, gasifying circuit and (if included) the air preheating circuit and lighting circuit. Simultaneously the circuit closer 114 establishes a circuit to the starting motor 118 as follows:—

*Starting motor circuit*

From positive battery (117), wire 160, contact 161, circuit controller 114, contact 162, wire 163, to starting motor 118, returning to battery 117 through wire 164 and ground, and as motor 118 cranks the hydrocarbon motor (not shown) in a well-known manner, the well-known action of producing a partial vacuum in the intake manifold, and to which gasifying unit 40 is attached, will cause a partial vacuum in chamber 165 of gasifying unit 41 above throttle valve 50. However, as said valve is completely closed, no combustible mixture can pass through venturi 35 and its correlative passages 35$^a$—35$^a$, or past accelerated speed valve 33. It will be noted that as handles 102 and 104 are still depressed the starting throttle valve 68 of gasifying unit 42 is wide open. Therefore, the partial vacuum is communicated through passage 58 to chamber 72 and thence past valve 68 and heating unit 75 to chamber 60$^a$ and venturi 62, and thence to chambers 21$^a$, 4$^a$ and 3$^a$ to atmosphere. As a result, air is drawn in to the several parts in the reverse order hereintofore named, and as it passes through venturi 62, highly heated fuel issues from nozzle 24, and due to it slow viscosity, is finely atomized, forming a combustible mixture which is drawn through the heating coil 77 of heating unit 75 in this manner converting the atomized fuel into a gas, and at the same time heating the combustion supporting gas, (air), whereafter the resulting gasified combustible mixture passes to the intake manifold (not shown) through opening 57 of unit 41 and thence to the cylinders of the motor.

Ordinarily when starting a hydro-carbon motor in the manner hereintofore described, only two to three revolutions of the crankshaft is required before explosions occur in the cylinders, the interval of time ordinarily required to crank a motor in this manner is so small, approximately two to four seconds that the heating units 26 and 75 do not cool sufficiently to prevent proper gasification of the combustible mixture passing through the starting gasification unit 42. If the motor does not start promptly after cranking, as hereintofore described, pressure on the starter button is released whereupon the circuit closer 115, again establishes the aforesaid heating circuits and, approximately five seconds thereafter starter button 116 is again depressed. Ordinarily a second depression of starting button 116, will positively start the motor.

Assume that the hydro-carbon motor (not shown) and to which applicant's improved combustion system has been attached has started as hereintofore described. As soon as the motor starts, the operator releases starter button 116 whereupon the circuit to the various heating units, as 18, 19, 26, 75, and 86, if the latter is employed, are re-established in this manner continuing the gasification of the combustible mixture passing through the starting gasifying unit 42.

As the motor begins to revolve, the starting throttle valve 68 is partially closed by allowing handle 104 to rise under pressure of spring 104$^a$ and until a proper idling speed has been reached. This closing movement of valve 68, however, is not sufficient to cause stop screw 140 to open normal operating throttle valve 50 to the idling position of said valve.

The hereintofore mentioned hydro-carbon motor is now permitted to operate with the starting period handle 102 depressed for a period of approximately fifteen seconds to one minute depending upon the atmospheric conditions under which the applicant's improved system is being operated. During this period the hot exhaust gases from the exhaust manifold 47, (shown in part in Figures 4 and 5, and more fully described in my application for Letters Patent, Serial Number 186,087, filed April 23rd, 1927), enter chamber 44 of gasifying unit 41 through passage 45 and flow substantially as shown by the arrows, in this manner heating the gasifying numbers 56—56, throttle section 49, and atomizing section 48, finally leaving by passage 46 to manifold 47. The flowing of the exhaust gases in exhaust manifold 47, their action to and from a gasifying unit, as 41, is more fully described in my pending application for Letters Patent, Serial Number 186,087, filed April 23rd, 1927, the accelerator pedal being assumed to be in the normal, or idling position and the hot gas regulator in the "C" or cold motor position.

After a lapse of the time interval hereintofore mentioned, the desired heat absorbed by the body portion 43 unit 41 is also conducted to the thermostat 52 whereupon its free end moves downwardly and contacts with fixed contact 54, in this manner establishing the normal operation indicating circuit, as follows:—

Normal operation indicating circuit

From positive battery (117) wire 167, lamp, or indicator, 168, wire 169, terminal post 56, thermostat 52, fixed post 54, returning to battery 117 via ground.

When the aforesaid circuit is established, lamp 168 is illuminated informing the operator that gasifying unit 41 is sufficiently hot to permit its use for gasifying of the atomized combustible mixture adapted to be formed by nozzles 16 and 17, whereupon said operator releases starting handles 102 and 104, and as throttle 68 is completely closed by action of rod 105 and lever 106, the stop screw 140 is caused to impinge on extension 126 of lever 125 in this manner opening normal operation throttle 50 to its idling position and, whereupon the air ceases to flow to the unit 42, and by the partial vacuum in chambers 165, 49$^a$ and 48$^a$, is restrained to flow from chamber 4$^a$ to verturi section 35, and, as said air passes through said venturi, its action causes atomized fuel to issue from nozzle tip 16$^a$ and form an atomized combustible mixture, the atomized fuel in which is gasified as it passes through chambers 48$^a$, 49$^a$ and 165—165, whereafter the gasified mixture passes into the intake manifold (not shown) and to the cylinders of the motor.

As disclosed in applicant's application for Letters Patent, Serial Number 186,087, filed April 23rd, 1927, during the idling and normal operating period of a hydro-carbon motor, it is desirable to partially or perhaps completely gasify the atomized fuel, whereas at full openings, (hill climbing performance), and especially with what is known as gasoline fuels, it is advisable to not gasify said atomized fuel. However under certain circumstances, it is very desirable to finally break up, or atomize, the fuel, and to this end applicant has devised a novel arrangement for preheating the fuel in the nozzle tubes whereby the viscosity thereof is made comparatively low, in this manner obtaining a finely atomized fuel issuing from the venturis as 35 and 33$^a$. The foregoing is accomplished in the following manner:—

When the accelerator pedal (not shown) is depressed to full, or nearly full open throttle positions of throttle valve 50, the accelerator rod 127 moves substantially to the left thereby causing boot 129 of throttle lever 125, to impinge on the head of screw 130, and without compressing spring 133, raise lever 131, whereupon the following circuit is established.

Accelerated speed nozzle heating circuit

From positive battery (117) wires 141, 155, lever 107, wires 156, 170, lever 131, (in raised position) wire 151, terminal post 31, heating units 18, 19 and 26, terminal post 32, returning to battery 117, via ground.

With the foregoing circuit established, the nozzle tubes 15, 16 and 22 are heated by heating units 18, 19 and 26 in this manner, also super-heating the fuel contained therein whereby its viscosity is very substantially lowered, and as the fuel issues from the nozzle tips 15$^a$ and 16$^a$ the surrounding current of air causes a substantially finer atomization than if the fuel were not super-heated as described.

It is to be noted that the screw 130 is adjustable with respect to lever 131 in this manner providing for various positions of opening of throttle 150 at which the last named circuit may be established.

After boot 129 has raised lever 131 to establish the last named circuit, further movement to the left, of accelerator rod 127 will result in compression of spring 134, and permit simultaneous further opening of throttle valve 50.

Prior to flowing to the nozzles the fuel in float chamber 6 is preferably preheated by the heating unit 13, this heating preferably occurring only during the operation period of a hydro-carbon motor. Therefore, the heat generated by unit 13 is only during the period that generator 119 generates substantially maximum voltage and at which time energy flows in the following circuit.

Float chamber heater circuit

From positive brush of generator 119 to wires 172, 173, switch 174, wire 175, terminal post 11, heating unit 13, terminal post 12 returning to generator 119 via wire 176 and ground.

By the novel arrangement of calorically insulating the float chamber 6 from the carburetor body 2 and supplying an independent heating source the heating of the fuel in said chamber may be varied, as for example, by the inclusion of the resistance 177 by opening switch 174 and which may be desirable during warmer seasons or in warm climates. If desired the heating coil 13 may be energized upon establishing the ignition circuit by the inclusion of a wire 178 shown dotted and connected between wire 170 and terminal post 11. With this arrangement, the circuit between generator 119 and terminal post 11 would be omitted.

It is to be noted that the lighting or other auxiliary circuit, other than the ignition circuit, and comprising wire 179, lighting switch 124, wires 180, 181, 182, 183, 184, head lamps 121 and 122, and tail light 123 are opened simultaneously with opening of the circuit closer 115, in this manner preventing a possible excess load on battery 117 when starting switch 97 is actuated to initiate the starting subsidiary carburation system in gasifying unit 42.

If desired, circuit closer 115 may be omitted and energy may be supplied to the lighting system and the various heating units as 18, 19, 26, 75 and 86. Simultaneously with cranking the motor by depressing starter switch 111 and under which circumstances battery 117 would be made large enough to supply the combined energy demands of the aforesaid combined circuits.

The air preheating adjunct shown in Figure 6, is preferably supplied with hydrocarbon motors for operation in cold climate or where such motors are called upon to operate during cold season of temperate climates. By the novel arrangement of preheating the air by heating means independently of the heat of combustion produced by a hydrocarbon motor, said motor is more readily started when cold whereafter the said heat of combustion may be employed to gasify the combustible mixture as described herein.

The method of supplying fuel to the nozzles 15 and 16 of carburetor 1, is more fully described in my pending application for Letters Patent, Serial Number 186,087, filed April 23rd, 1927.

It will be noted that as long as thermostat 52 remains in contact with post 54 the lamp 168 will remain lighted. Therefore, if for any reason an operator stops his motor for any length of time and again wishes to start it, lamp 168 will indicate whether gasifying unit 41 is sufficiently warm to start said motor without the use of the starting unit 42. If the lamp is still lighted when it is desired to start said motor, the operator will slightly open throttle 50 in well-known manner and thereafter depress starter switch 111 whereupon the motor will start without depressing starting handles 102 and 104 of starting switch 97.

What I claim is:—

1. In combination with an internal combustion motor arranged to be initially started and normally operated on a non-readily volatile fuel the motor having an intake passage in communication therewith, of a carbureting device normally connected to the passage for normally supplying a combustible mixture thereto during normal operation of the motor, a heater arranged to receive exhaust gases from the motor for heating the device whereby the combustible mixture is gasified therein during normal operation of the motor, a subsidiary carbureting device normally disconnected from the intake passage for producing a starting combustible mixture charge for starting the motor, a heater supported thereby for gasifying the combustible mixture passing therethrough, means for cranking the motor, and control means for disconnecting the normal carbureting device from the passage and connecting the subsidiary carbureting device thereto and simultaneously supplying energy to the subsidiary device heater whereby the combustible mixture passing therethrough will be gasified upon initial cranking of the motor by the cranking means.

2. In combination with an internal combustion motor arranged to be initially started and normally operated on a non-readily volatile fuel the motor having an intake passage in communication therewith, of a carbureting device normally connected therewith for normally supplying a combustible mixture thereto during normal operation of the motor, a heater arranged to receive exhaust gases from the motor for heating the device whereby the combustible mixture is gasified therein during normal operation of the motor, a subsidiary carbureting device normally disconnected from the intake passage for producing a starting combustible mixture charge for starting the motor, a heater supported thereby for gasifying the combustible mixture passing therethrough, means for cranking the motor, control means for disconnecting the normal carbureting device from the intake passage and connecting the subsidiary device thereto and simultaneously supplying energy to the subsidiary heater whereby the combustible mixture passing therethrough will be gasified upon initial cranking of the motor by the cranking means, and means controlled by the cranking means for annulling the energy supply to the subsidiary heater upon effecting operation of the cranking means.

3. In combination with an internal combustion motor having an intake passage in communication therewith, of a carbureting device for normally supplying a combustible mixture to the intake passage having a throttle valve therefor controlling the combustible mixture flow therethrough, a subsidiary carbureting device for supplying a combustible mixture to the intake passage during the starting period of the motor having a throttle valve therefor controlling the combustible mixture flow therethrough, means normally positioning the normal throttle valve to idling position of the motor, means for actuating the subsidiary throttle valve, and means associated with the last named means for controlling the normal valve positioning means whereby when the subsidiary valve is closed and no combustible mixture flows from the subsidiary carbureting device to the passage, the normal valve positioning means restrains the normal valve to idling position of the motor, and when the subsidiary valve is actuated to open position whereby a combustible mixture is supplied by the subsidiary device to the passage, the normal valve positioning means restrains the normal valve to a closed position whereby no combustible mixture can flow through the normal carbureting device to the passage.

4. In combination with an internal combustion motor arranged to be initially started and normally operated on non-readily volatile fuel the motor having an intake passage in communication therewith, of a carbureting device normally connected therewith for normally supplying a combustible mixture thereto during normal operation of the motor, a heater arranged to receive exhaust gases from the motor for heating the device whereby the combustible mixture is gasified therein during normal operation of the motor, a subsidiary carbureting device normally disconnected from the intake passage for producing a starting combustible mixture charge for starting the motor, a heater arranged therewith for gasifying the combustible mixture passing therethrough, means for cranking the motor, control means for disconnecting the normal carbureting device from the passage and connecting the subsidiary device thereto and simultaneously supplying energy to the subsidiary device heater whereby the combustible mixture passing therethrough will be gasified upon initial cranking of the motor by the cranking means, and manually operated means for actuating the control means.

5. In combination with a vehicle and an internal combustion motor supported thereby arranged to be initially started and normally operated on a non-readily volatile fuel the motor having an intake passage in communication therewith, of a carbureting device normally connected thereto for normaly supplying a combustible mixture thereto during the normal operation of the motor, a heater arranged to receive exhaust gases from the motor for heating the device whereby the combustible is gasified therein during the normal operation of the motor, a subsidiary carbureting device normally disconnected from the intake passage for producing a starting combustible mixture charge for starting the motor, a heater associated therewith for gasifying the combustible mixture passing therethrough, means for cranking the motor, control means for disconnecting the normal carbureting device from the intake passage and connecting the subsidiary carbureting device thereto and simultaneously supplying energy to the subsidiary heater whereby the combustible mixture passing through the subsidiary device will be gasified upon effecting initial cranking of the motor by the cranking means, normally non-indicating means positioned in view of the vehicle operator for indicating the thermal condition of the normal heater, and thermostatic means positioned in the normal heater for rendering the indicating means effective to render an indication when the heater has attained a temperature sufficient to properly gasify the mixture, and cancel the indication when the temperature thereof has lowered sufficiently whereby the proper gasification of the mixture will not obtain.

6. In combination with an internal combustion motor having an intake passage in communication therewith, of a carbureting device for normally supplying a combustible mixture to the intake passage having a throttle valve therein for controlling the combustible mixture flow therethrough, a subsidiary carbureting device for supplying a combustible mixture to the intake passage during the starting period of the motor having a throttle valve therein controlling the combustible mixture flow therethrough, means normally positioning the normal throttle valve to idling position of the motor, means for controlling the operation of the subsidiary throttle valve, means controlled by the last named means for controlling the normal throttle valve positioning means whereby when the subsidiary throttle valve is closed whereby no combustible mixture will flow through the subsidiary device to the passage, the normal valve positioning means restrains the normal valve to idling position of the motor, and when the subsidiary valve is operated to open position whereby a combustible mixture is supplied by the subsidiary device to the passage, the normal valve positioning means restrains the normal valve to closed position whereby no combustible mixture can flow through the normal device to the motor, and means supported by the normal valve positioning means for adjustably positioning the normal valve to predetermined and variable idling positions.

7. In combination with an internal combustion motor arranged to be initially started and normally operated on a non-readily volatile fuel the motor having an intake passage in communication therewith, of a carbureting device normally connected thereto for normally supplying a combustible mixture to the intake passage during normal operation of the motor, a heater arranged to receive exhaust gases from the motor for heating the normal device whereby the combustible mixture is gasified therein during normal operation of the motor, a subsidiary carbureting device normally dis-connected from the intake passage for producing a combustible mixture charge for starting the motor, a heater associated therewith for gasifying the mixture passing therethrough, means for cranking the motor, combustible mixture flow control means comprising, means actuated by the control means for connecting the subsidiary device to the intake passage and means also actuated by the control means for dis-connecting the normal device from the passage, and manually operated means for actuating the control means and simultaneously supplying energy to the subsidiary heater whereby the subsidiary device will be effective to supply a gasified combustible mixture to the intake passage upon initial cranking of the motor by the cranking means.

8. In combination with an internal combustion motor arranged to be initially started and normally operated on a non-readily volatile fuel the motor having an intake passage in communication therewith, of a carbureting device normally connected thereto for normally supplying a combustible mixture to the intake passage during normal operation of the motor, a heater associated therewith arranged to receive exhaust gases from the motor for heating the normal device whereby the combustible mixture passing therethrough is gasified therein during normal operation of the motor, a subsidiary carbureting device normally dis-connected from the intake passage for producing a starting combustible mixture charge for starting the motor comprising, means for atomizing the fuel, a subsidiary passage connecting the combustible mixture forming means and the intake passage, a heater associated therewith arranged to receive energy from a source for heating the passage prior to starting the motor whereby the mixture will be gasified therein, means for cranking the motor, and control means for dis-connecting the normal device from the intake passage and connecting the subsidiary device thereto and simultaneously supplying energy from the source to the subsidiary heater whereby the combustible mixture passing through the subsidiary passage will be gasified upon initially cranking the motor by the cranking means.

9. In combination with a vehicle, an internal combustion motor supported thereby and a carbureting device supported by the motor for supplying a combustible mixture thereto, the device having a heater therefore arranged to gasify the combustible mixture passing therethrough, of normally non-indicating means positioned in view of the vehicle operator for indicating the thermal condition of the heater, and thermostatic means positioned within the heater for rendering the indicating means effective to render an indication upon a predetermined increase of temperature of the heater whereat proper gasification will obtain and cancel the indication upon a predetermined decrease in the temperature thereof whereat proper gasification of the mixture will not obtain.

10. In combination with an internal combustion motor and a carbureting device having a heater for the heating thereof, of an electric generator driven by the motor, a storage battery arranged to be charged by the operator, a cut-out switch having a contact arranged in a circuit connected between the battery and the generator for controlling the charging of the battery by the generator, and a circuit from the generator to the heater connected between the generator and the cut-out switch contact whereby when the cut-out contact is closed energy may flow from both the battery and the generator to the heater and when the contact is open the energy can flow only from the generator to the heater.

11. In combination with an internal combustion motor having a normal carburation system controlled by a normal throttle valve normally positioned to supply combustible mixture for idling of the motor, of means for cranking the motor, a starting carburation system for the motor having a throttle valve normally positioned whereby no combustible mixture can pass therethrough to the motor, and control means for simultaneously moving the valves whereby the normal throttle valve moves to the closed position whereby no combustible mixture can flow to the motor and the starting throttle valve moves from the closed to the open position whereby a combustible mixture will be supplied to the motor from the starting system when the motor is cranked by the starting means.

12. In combination with an internal combustion motor having a normal carburation system controlled by a normal throttle valve normally positioned to supply combustible mixture for idling of the motor, of means for cranking the motor, a starting carburation system for the motor having a throttle valve normally positioned whereby no combustible mixture can pass therethrough to the motor and manually operated control means for simultaneously moving the valves whereby the normal throttle valve moves to the closed position whereby no combustible mixture can flow to the motor and the starting throttle valve moves from the closed to the open position whereby a combustible mixture will be supplied by the starting system when the motor is cranked by the cranking means.

13. In combination with an internal combustion motor having an intake passage in communication therewith, of a normal carburation system for supplying a combustible mixture to the intake passage having a throttle valve positioned to idling position whereby a substantially small flow of mixture is supplied to the passage, a starting carburation system for supplying combustible mixture to the intake passage having a throttle valve normally positioned whereby no mixture will flow from the starting system to the passage, means for cranking the motor, and means for dependently operating the valves whereby the normal valve is moved from the idling position to a completely closed position and the starting valve is moved from the completely closed position to an open position whereby all the mixture supplied to the passage will be furnished by the starting system as the motor is cranked by the cranking means.

14. In combination with an internal combustion motor having an intake passage in communication therewith, of a carburation system for supply a combustible mixture to the intake passage, a heater for heating the combustible mixture, a source of energy, means for connecting the heater to the source, means for cranking the motor, means for connecting the cranking means to the source, and means rendered effective by operation of the cranking connecting means to connect the source to the cranking means for annulling the heater connecting means whereby the only energy required from the source during the cranking of the motor will be that consumed by the cranking means.

15. In combination with an internal combustion motor having an intake passage in communciation therewith, of a carburation system for supplying a combustible mixture to the passage, a heater associated therewith for heating the mixture, a source of energy, means for connecting the heater to the source for heating the mixture, a generator for charging the source, a circuit connected between the generator and the source, and means rendered effective by operation of the heater connecting means to connect the heater to the source for opening the circuit between the generator and the source.

16. In combination with a vehicle supporting a lighting system and an internal combustion motor having a normal carburation system and a starting carburation system, of a source of energy, means for connecting the source to the lighting system for effecting illumination for the vehicle, means for selectively rendering the carburation systems effective to supply mixture to the motor, a heater associated with the carburation systems for heating the mixture supplied thereby, means for connecting the heater to the source, means for cranking the motor, and means rendered effective by operation of the cranking means for simultaneously annulling the lighting system connecting means and the heater connecting means whereby the only energy drain on the source will be that required for cranking the motor.

17. In combination with a vehicle supporting a lighting system and an internal combustion motor having a carburation system, of a source of energy, means for connecting the source to the system for effecting illumination for the vehicle, a heater associated with the carburation system for heating the mixture supplied thereby, means for connecting the source to the heater, means associated with the source for cranking the motor, and means rendered effective by effecting operation of the cranking means for annulling the lighting system connecting means and the heater connecting means as the motor is cranked whereby the only energy drain on the source will be that required for cranking the motor.

18. In combination with an internal combustion motor having a carburation system for supplying a combustible mixture thereto, of a throttle valve for controlling the mixture flow, a heater for heating the mixture, a source of energy, a circuit connecting the source and the heater, a normally open circuit closer in the circuit, means for operating the throttle valve, and means rendered effective by the operation thereof for closing the circuit closer during the final opening movements of the throttle valve whereby the heater is energized during the more open positions of the valve.

In testimony whereof, Oscar A. Ross has signed his name to this specification this 17th day of May, 1927.

OSCAR A. ROSS.